(12) United States Patent
Born

(10) Patent No.: US 12,512,174 B2
(45) Date of Patent: Dec. 30, 2025

(54) SYSTEMS AND METHODS FOR SERIALIZED INITIALIZATION CIRCUITRY

(71) Applicant: Advanced Micro Devices, Inc., Santa Clara, CA (US)

(72) Inventor: Richard Martin Born, Ft. Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 109 days.

(21) Appl. No.: 18/622,594

(22) Filed: Mar. 29, 2024

(65) Prior Publication Data

US 2025/0308611 A1 Oct. 2, 2025

(51) Int. Cl.
*G11C 29/14* (2006.01)
*G11C 29/12* (2006.01)

(52) U.S. Cl.
CPC ........ *G11C 29/14* (2013.01); *G11C 29/12005* (2013.01)

(58) Field of Classification Search
CPC ..................................... G11C 29/14

USPC ......................................... 365/201
See application file for complete search history.

(56) References Cited

U.S. PATENT DOCUMENTS

| | | | |
|---|---|---|---|
| 2008/0206904 A1* | 8/2008 | McCarthy | G11C 29/48 438/15 |
| 2015/0062218 A1* | 3/2015 | Abello Rosello | B41J 11/44 347/10 |
| 2018/0096735 A1* | 4/2018 | Pappu | H01L 25/18 |
| 2021/0225426 A1* | 7/2021 | Moon | G11C 11/4096 |
| 2022/0375898 A1* | 11/2022 | Pandit | H01L 25/0657 |

* cited by examiner

*Primary Examiner* — Muna A Techane
(74) *Attorney, Agent, or Firm* — Greenberg Traurig, LLP

(57) ABSTRACT

The disclosed device includes initialization circuitry configured to perform an activity, with multiple phases, on multiple dies (e.g., a first die and a second die) within an integrated circuit. The initialization circuitry can be configured to serialize one or more phases of the activity across the dies by initiating a phase of the activity on the first die prior to initiating the phase of the activity on the second die. Various other methods, systems, and computer-readable media are also disclosed.

20 Claims, 4 Drawing Sheets

SYSTEMS AND METHODS FOR SERIALIZED INITIALIZATION CIRCUITRY

BACKGROUND

A multi-die integrated circuit is more powerful than a single-die. However, increasing the number of dies in a circuit also increases the number of operations that need to be performed during an initialization process (as many initialization operations must be performed on every die), increasing the time and resources required to complete the initialization process.

BRIEF DESCRIPTION OF THE DRAWINGS

The accompanying drawings illustrate a number of exemplary implementations and are a part of the specification. Together with the following description, these drawings demonstrate and explain various principles of the present disclosure.

Figure 1:
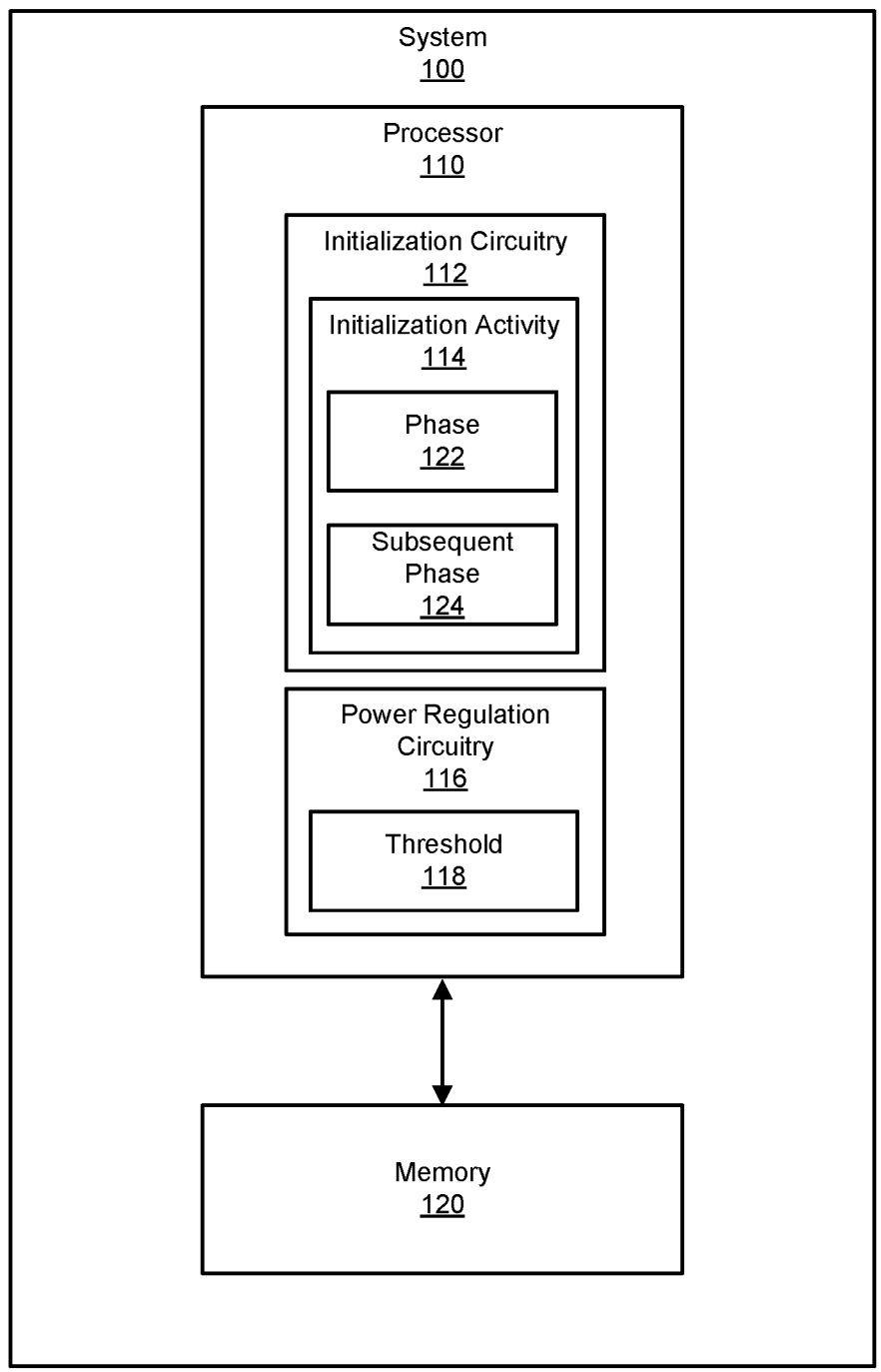
FIG. 1 is a block diagram of an exemplary system for a serialized initialization circuitry.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the present disclosure covers all modifications, equivalents, and alternatives falling within the scope of the appended claims.

DETAILED DESCRIPTION

Certain initialization activities (e.g., repair fuse readings, Memory Built-In Self Tests (MBIST), and memory initialization sequences) must be performed on multiple dies (e.g., each die) within a multi-die integrated circuit. Triggering such activities on each of the multiple dies in parallel can cause a current spike or an excessive current draw on the integrated circuit's power regulators. One solution to avoid a current spike or excessive current draw involves throttling the power allocated to each die (e.g., such that each initialization activity is executed on each die in parallel but at a slower speed). However, such an approach can compromise the intended purpose of the operation (e.g., MBIST not being done at the correct frequency).

To eliminate or mitigate spikes and excessive current draws, the instant disclosure describes (e.g., as an alternative to a throttling solution) a framework that performs one or more initialization activities on multiple dies (e.g., each die) in an integrated circuit by serializing (e.g., staggering) the initialization activities across the dies. In some examples, an initialization activity may only be triggered on a designated number of dies at a time (e.g., one die, the base die and one X3D die, two X3D dies, etc.), with the completion of an initialization activity on one die (or set of dies) triggering its initiation on the next die (or set of dies). In additional or alternative examples, a certain amount of overlap in execution may be permitted, such that an initialization activity is enabled on a second die (or set of dies) some time after the activity has begun executing on a first die (or set of dies) but prior to the completion of the activity on the first die (or set of dies). The staggering of the activities can be predesignated (e.g., following a standard serialization schema) or dynamically determined (e.g., based on a current power consumption of an integrated circuit).

In some examples, the phases of a particular initialization activity can be individually serialized across multiple dies of an integrated circuit. In one such example, the initiation of a particular phase of an initialization activity can be serialized across multiple dies and, once the phase has been performed on each of the dies and/or a designated number of the dies (or some other metric has been satisfied), the initiation of a second (e.g., subsequent) phase of the activity can be serialized across the multiple dies.

In some examples, certain phases of an initialization activity (e.g., phases that are less resource intensive) can be performed in parallel across multiple dies while other phases (e.g., phases that are more resource intensive) can be serialized. By serializing initialization activities (e.g., entire activities and/or specific phases of an activity) that are performed on multiple dies within an integrated circuit, current spikes or excessive current draws on a 3D integrated circuit's power regulators may be eliminated or mitigated.

In one implementation, a device for serializing the phases on an initialization activity includes initialization circuitry configured to perform an activity (e.g., a repair fuse reading, a memory built-in self test (MBIST), and/or a memory initialization sequence), including multiple phases, on multiple dies within a multi-die integrated circuit, where the initialization circuitry is configured to serialize one or more phases of the activity across the dies by initiating a phase of the activity on a first die prior to initiating the phase of the activity on a second die (e.g., without throttling the phase of the activity on any of the dies).

In some examples, performing the phase of the activity on the first die prior to performing the phase of the activity on the second die includes performing the phase of the activity on the second die only after the phase of the activity is completed on the first die. In other examples, performing the phase of the activity on the first die prior to performing the phase of the activity on the second die includes performing the phase of the activity on the second die after the phase of the activity has been initiated on the first die but prior to the completion of the phase of the activity on the first die.

In some examples, the initialization circuitry is configured to serialize the phase of the activity in response to determining that an amount of power, estimated to be consumed by performing the phase of the activity on both the first die and the second die at the same time, surpasses a threshold.

In some embodiments, the first die represents a base die and the second die represents an extensible 3D cache (X3D) die. In other embodiments, both the first die and the second die represent an X3D die.

In some aspects, the techniques described herein relate to a system including a physical memory, a multi-die integrated circuit with multiple dies, initialization circuitry configured to perform an activity (e.g., a repair fuse reading, MBIST, and/or a memory initialization sequence), which includes multiple phases, on each die within the multiple dies as part of an initialization process, and power regulation circuitry configured to maintain, for the multi-die integrated circuit, an estimated power consumption that remains below a threshold throughout the initialization process, where the power regulation circuitry maintains the estimated power consumption below the threshold by serializing one or more phases of the activity across the multiple dies (e.g., without throttling any of the one or more phases on any of the dies).

In some examples, serializing the one or more phases across the multiple dies includes initiating a phase of the activity on an first die within the multiple dies (e.g., a base die and/or an X3D die) prior to initiating the phase of the activity on a second die within the multiple dies (e.g., an X3D die). In these examples, performing the phase of the activity on the first die prior to performing the phase of the activity on the second die can include performing the phase of the activity on the second die only after the phase of the activity is completed on the first die and/or performing the phase of the activity on the second die after the phase of the activity has been initiated on the first die but prior to the completion of the phase of the activity on the first die. In some examples, the initialization circuitry is configured to serialize the phase of the activity in response to determining that an amount of power, estimated to be consumed by performing the phase of the activity on both the first die and the second die at the same time, surpasses a threshold.

In one implementation, the techniques described herein relate to a computer-implemented method including performing a phase of an initialization activity (e.g., a repair fuse reading, MBIST, and/or a memory initialization sequence) on multiple dies within a multi-die integrated circuit, where an initiation time for the phase of the initialization activity on each die within the multiple dies is staggered.

Features from any of the implementations described herein can be used in combination with one another in accordance with the general principles described herein. These and other implementations, features, and advantages will be more fully understood upon reading the following detailed description in conjunction with the accompanying drawings and claims.

The following will provide, with reference to FIGS. 1-4 detailed descriptions of serialized initialization across multiple dies. Detailed descriptions of example systems are provided in connection with FIG. 1. Detailed descriptions of an example processor/instruction pipeline are provided in connection with FIG. 2. Detailed descriptions of an example multi-die integrated circuit are provided in connection with FIG. 3 Detailed descriptions of corresponding computer-implemented methods will also be provided in connection with FIG. 4.

FIG. 1 is a block diagram of an example system 100 for serializing initialization operations. System 100 corresponds to a computing device, such as a desktop computer, a laptop computer, a server, a tablet device, a mobile device, a smartphone, a wearable device, an augmented reality device, a virtual reality device, a network device, and/or an electronic device. As illustrated in FIG. 1, system 100 includes one or more memory devices, such as memory 120. Memory 120 generally represents any type or form of volatile or non-volatile storage device or medium capable of storing data and/or computer-readable instructions. Examples of memory 120 include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, and/or any other suitable storage memory.

As illustrated in FIG. 1, example system 100 includes one or more physical processors, such as processor 110. Processor 110 generally represents any type or form of hardware-implemented processing unit capable of interpreting and/or executing computer-readable instructions. In some examples, processor 110 accesses and/or modifies data and/or instructions stored in memory 120. Examples of processor 110 include, without limitation, chiplets (e.g., smaller and in some examples more specialized processing units that can coordinate as a single chip), microprocessors, microcontrollers, Central Processing Units (CPUs), graphics processing units (GPUs), Field-Programmable Gate Arrays (FPGAs) that implement softcore processors, Application-Specific Integrated Circuits (ASICs), systems on chip (SoCs), digital signal processors (DSPs), Neural Network Engines (NNEs), accelerators, graphics processing units (GPUs), portions of one or more of the same, variations or combinations of one or more of the same, and/or any other suitable physical processor. In some examples, as will be described in greater detail below, processor 110 can represent a multi-die integrated circuit (such as multi-die integrated circuit 300 in FIG. 3) and/or can perform one or more initialization tasks for a multi-die integrated circuit (e.g., multi-die integrated circuit 300 in FIG. 3).

In some implementations, the term "instruction" refers to computer code that can be read and executed by a processor. Examples of instructions include, without limitation, macro-instructions (e.g., program code that requires a processor to decode into processor instructions that the processor can directly execute) and micro-operations (e.g., low-level processor instructions that can be decoded from a macro-instruction and that form parts of the macro-instruction).

As further illustrated in FIG. 1, processor 110 can include an initialization circuitry 112. Initialization circuitry 112 corresponds to a circuitry for managing initialization operations (e.g., initialization activity 114) performed on two or more dies of a multi-die integrated circuit, such as processor 110 and/or a multi-die integrated circuit that operates in connection with (e.g., supports) processor 110 as part of an initialization process. Processor 110 can also include a power regulation circuitry 116 configured to maintain, for the multi-die-integrated circuit, a power consumption that remains below a threshold 118 throughout the initialization process (e.g., by serializing initialization activities and/or phases of an initialization activity across the multiple dies such that the power consumption remains below threshold 118).

Figure 2:
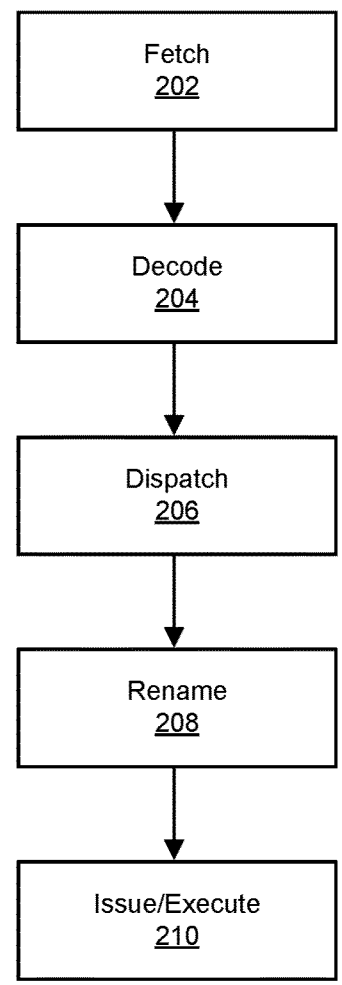
FIG. 2 is a flow diagram of an exemplary instruction pipeline.

FIG. 2 illustrates an exemplary pipeline 200 for a processor, such as processor 110 (and/or a functional unit thereof), for executing instructions. During a fetch stage 202, processor 110 can read program instructions from memory 120. Processor 110 can fetch program instructions based on an active thread or other criteria. At decode stage 204, processor 110 can decode the read program instructions into micro-operations. Processor 110 (and/or a functional unit thereof) can forward the newly decoded micro-operations to a scheduler that can queue micro-operations until they are ready for dispatch. At dispatch stage 206, the scheduler can dispatch one or more micro-operations that are ready for dispatch. At rename stage 208, processor 110 can allocate registers to the dispatched micro-operation as needed. At issue/execute stage 210, processor 110 and/or an execution unit thereof executes the dispatched micro-operations.

Although FIG. 2 illustrates a basic example pipeline 200, in other examples processor 110 can include additional or fewer stages, perform the stages in various orders, repeat iterations, and/or perform stages in parallel. For instance, as an instruction proceeds through the stages, a next instruction can follow so as not to leave a stage inactive. However, certain instructions (e.g., a branch such as a conditional jump instruction) can change the next instruction depending on a result of executing the instruction. For example, a conditional jump can be "taken" such that the next instruction jumps to a different place in program memory. Alternatively, the conditional jump can be "not taken" such that the next instruction continues with the next instruction in the program memory.

Figure 3:
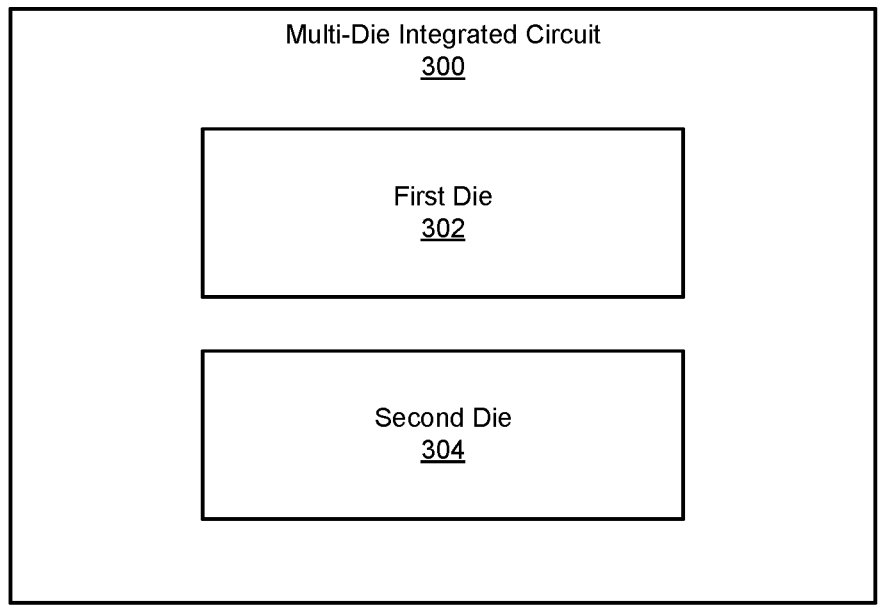
FIG. 3 is a block diagram of an exemplary multi-die integrated circuit.

FIG. 3 illustrates an exemplary multi-die integrated circuit 300. The term "multi-die integrated circuit" can refer to any type or form of hardware-implemented processing unit, capable of interpreting and/or executing computer-readable-instructions, that includes multiple dies (e.g., first die 302 and second die 304) integrated in a single package. Each die can represent a single (e.g., continuous) semiconductor material (e.g., silicone) that houses one or more of the integrated circuit's processor cores. In some examples, the dies can be vertically stacked. The dies can include a base (e.g., primary) die and one or more additional dies. In some examples, first die 302 can represent a base die and second die 304 can represent an additional die. In other examples, both first die 302 and second die 304 can represent an additional die (integrated with a base die). The additional die can represent any type or form of die. In one embodiment, the additional die can represent an extensible 3D cache (X3D) die.

As part of an initialization process, configured for multi-die integrated circuit 300, initialization circuitry 112 can be configured to perform initialization activity 114 on multiple (e.g., each) of the dies within multi-die integrated circuit 300. Initialization activity 114 can refer to any type or form of activity that can (e.g., must) be performed on multiple dies (e.g., each die of an integrated circuit) during an initialization process. In some examples, initialization activity 114 can represent a repair fuse reading, a memory built-in self test (MBIST), or a memory initialization sequence. In some examples, initialization activity 114 can include multiple phases. The term "phase" can refer to any type or form of portion (e.g., sub-task) performed as part of an initialization activity.

To avoid a current spike or excessive current draw, initialization circuitry 112 can be configured to serialize initialization activity 114 across the dies of multi-die integrated circuit 300 on which initialization activity 114 is to be performed. For example, in an example in which initialization activity 114 is to be performed on both first die 302 and second die 304, initialization circuitry 112 can initiate initialization activity 114 on first die 302 prior to initiating initialization activity 114 on second die 304. This can, in some implementations, enable initialization circuitry 112 to perform initialization activity 114 on multiple dies within multi-die integrated circuit 300 without throttling the activity (e.g., on any of the dies).

In some examples, initialization circuitry 112 can be configured to perform initialization activity 114 on second die 304 only after initialization activity 114 is completed on first die 302 (e.g., in response to determining that initialization activity 114 is completed on first die 302). In other examples, initialization circuitry 112 can be configured to perform initialization activity 114 on second die 304 after initialization activity 114 has been initiated on first die 302 but prior to the completion of initialization activity 114 on first die 302 (e.g., initialization circuitry 112 can permit a certain amount of overlap in the performing of initialization activity 114 on first die 302 and second die 304). In such examples, initialization circuitry 112 can initiate performing initialization activity 114 on second die 204 in response to a variety of triggers (e.g., determining that a designated amount of time has lapsed since the performing of initialization activity 114 was initiated on first die 302, determining that a designated percentage of initialization activity 114 has been completed on first die 302, determining that an estimated power consumption of multi-die integrated circuit 300 has fallen below a threshold, etc.).

In some examples (e.g., in which multi-die integrated circuit 300 operates as part of a firmware state machine), initialization circuitry 112 can serialize individual phases of initialization activity 114 by initiating a first phase (e.g., phase 122) on a first die (e.g., first die 302) prior to initiating the first phase on a second die (e.g., second die 304). In these examples, initialization circuitry 112 can initiate the first phase on the second die in response to a variety of triggers. For example, initialization circuitry 112 can initiate the first phase on the second die in response to determining that the first phase has been completed on the first die. Additionally or alternatively, initialization circuitry 112 can initiate the first phase on the second die in response to determining that an estimated power consumption of multi-die integrated circuit 300 has fallen below a threshold. In some examples, initialization circuitry 112 can initiate the first phase on the second die after the first phase of the activity has been initiated on the first die but prior to the completion of the first phase of the activity on the first die (e.g., in response to determining that a designated percentage of the first phase has been completed on the first die and/or that a designated amount of time has elapsed since the first phase was initiated on the first die).

After initiating (e.g., completing) the first phase on at least one die, initialization circuitry can initiate a second phase (e.g., subsequent phase 124) on the first die. Initialization circuitry 112 can initiate the second phase on the first die in response to a variety of triggers (e.g., determining that the first phase is completed on each of the dies within multi-die integrated circuit 300 and/or a designated number of the dies within multi-die integrated circuit, determining that the first phase is completed on the first die, determining that an estimated power consumption has fallen below a threshold, etc.).

The serialization of initialization activity 114, and/or of a phase of initialization activity 114, can include a variety of features that can be preconfigured and/or dynamically determined (e.g., based on a current and/or estimated power consumption of multi-die integrated circuit 300). Such features can include an order for the serialization across the dies of multi-die integrated circuit 300, an amount of overlap in the performance of initialization activity 114 and/or of the phase on different dies, a number of dies on which initialization activity 114 and/or the phase can be performed at one time (e.g., in parallel), etc. In some examples, initialization circuitry 112 can be configured to serialize the performance of initialization activity 114 and/or the phase each time initialization activity 114 and/or the phase is performed. In other examples, initialization circuitry 112 can be configured to determine whether to serialize the performance of initialization activity 114 and/or the phase across multiple dies in real-time (e.g., in response to determining that an amount of power, estimated to be consumed by performing initialization activity 114 and/or the phase on each of the multiple dies in parallel, surpasses a threshold and/or receiving a determination from a learned model).

Figure 4:
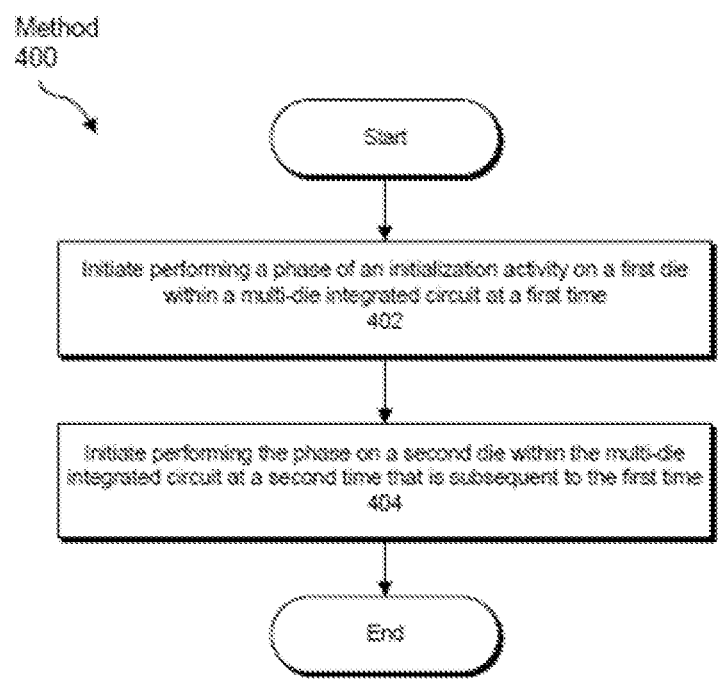
FIG. 4 is a flow diagram of an exemplary method for staggering an initialization activity.

FIG. 4 is a flow diagram of an exemplary computer-implemented method 400 for staggering phases of an initialization activity. The steps shown in FIG. 4 can be performed by any suitable circuit, computer-executable code and/or computing system, including the system(s) illustrated in FIGS. 1 and/or 3. In one example, each of the steps shown in FIG. 4 can represent an algorithm whose structure includes and/or is represented by multiple sub-steps, examples of which will be provided in greater detail below.

As illustrated in FIG. 4, one or more of the systems described herein can perform a phase of an initialization activity on multiple dies within a multi-die integrated circuit by staggering an initiation time for the phase on each die within the multiple dies. For example, at step 402 one or more of the systems described herein can initiate performing a phase of an initialization activity on a first die within a multi-die integrated circuit at a first time. Then, at step 404, one or more of the systems described herein can initiate performing the phase of the initialization activity on a second die with the multi-die integrated circuit at a second time that is subsequent to the first time. In some examples, the systems can perform the phase of the initialization activity (e.g., at staggered times as described at steps 402 and 404) in the context described in FIGS. 1-3 (e.g., using any of the features described in connection with FIGS. 1-3).

In some examples, the one or more systems can initiate performing the phase of the initialization activity on the second die only after the phase is completed on the first die. For example, the one or more systems can initiate performing the phase on the second die in response to determining that the phase is completed on the first die. In some examples the one or more systems can initiate performing the phase on the second die after the phase has been initiated on the first die but prior to the completion of the phase on the first die (e.g., after a designated time has passed since the phase has been initiated on the first die).

In some examples, the term "memory device" generally refers to any type or form of volatile or non-volatile storage device or medium capable of storing data and/or computer-readable instructions. In one example, a memory device stores, loads, and/or maintains one or more of the modules and/or circuits described herein. Examples of memory devices include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, or any other suitable storage memory.

In some examples, the term "physical processor" generally refers to any type or form of hardware-implemented processing unit capable of interpreting and/or executing computer-readable instructions. In one example, a physical processor accesses and/or modifies one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), systems on a chip (SoCs), digital signal processors (DSPs), Neural Network Engines (NNEs), accelerators, graphics processing units (GPUs), portions of one or more of the same, variations or combinations of one or more of the same, or any other suitable physical processor.

In some implementations, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein are shown or discussed in a particular order, these steps do not necessarily need to be performed in the order illustrated or discussed. The various exemplary methods described and/or illustrated herein can also omit one or more of the steps described or illustrated herein or include additional steps in addition to those disclosed.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A device comprising:
   initialization circuitry configured to perform an activity, comprising a plurality of phases, on a plurality of dies within a multi-die integrated circuit, wherein:
   the initialization circuitry is configured to serialize one or more phases of the activity across the plurality of dies by initiating a phase of the activity on a first die within the plurality of dies prior to initiating the phase of the activity on a second die within the plurality of dies.

2. The device of claim 1, wherein the activity comprises at least one of:
   a repair fuse reading;
   a memory built-in self test (MBIST); or
   a memory initialization sequence.

3. The device of claim 1, wherein performing the phase of the activity on the first die prior to performing the phase of the activity on the second die comprises performing the phase of the activity on the second die only after the phase of the activity is completed on the first die.

4. The device of claim 1, wherein performing the phase of the activity on the first die prior to performing the phase of the activity on the second die comprises performing the phase of the activity on the second die after the phase of the activity has been initiated on the first die but prior to the completion of the phase of the activity on the first die.

5. The device of claim 1, wherein the initialization circuitry is configured to serialize the phase of the activity in response to determining that an amount of power, estimated to be consumed by performing the phase of the activity on both the first die and the second die at the same time, surpasses a threshold.

6. The device of claim 1, wherein the first die comprises a base die and the second die comprises an extensible 3D cache (X3D) die.

7. The device of claim 1, wherein the first die comprises a first extensible 3D cache (X3D) die and the second die comprises a second X3D die.

8. The device of claim 1, wherein serializing the phase of the activity across the plurality of dies comprises performing the phase of the activity on each die within the plurality of dies without throttling the phase of the activity on any of the dies.

9. A system comprising:
a physical memory;
a multi-die integrated circuit comprising a plurality of dies;
initialization circuitry configured to perform an activity, comprising a plurality of phases, on each die within the plurality of dies as part of an initialization process; and
power regulation circuitry configured to maintain, for the multi-die integrated circuit, an estimated power consumption that remains below a threshold throughout the initialization process, wherein the power regulation circuitry maintains the estimated power consumption below the threshold by serializing one or more phases of the activity across the plurality of dies.

10. The system of claim 9, wherein the activity comprises at least one of:
a repair fuse reading;
a memory built-in self test (MBIST); or
a memory initialization sequence.

11. The system of claim 9, wherein serializing the one or more phases across the plurality of dies comprises initiating a phase of the activity on an first die within the plurality of dies prior to initiating the phase of the activity on a second die within the plurality of dies.

12. The system of claim 11, wherein performing the phase of the activity on the first die prior to performing the phase of the activity on the second die comprises performing the phase of the activity on the second die only after the phase of the activity is completed on the first die.

13. The system of claim 11, wherein performing the phase of the activity on the first die prior to performing the phase of the activity on the second die comprises performing the phase of the activity on the second die after the phase of the activity has been initiated on the first die but prior to the completion of the phase of the activity on the first die.

14. The system of claim 11, wherein the initialization circuitry is configured to serialize the phase of the activity in response to determining that an amount of power, estimated to be consumed by performing the phase of the activity on both the first die and the second die at the same time, surpasses a threshold.

15. The system of claim 11, wherein the first die comprises a base die and the second die comprises an extensible 3D cache (X3D) die.

16. The system of claim 11, wherein the first die comprises a first extensible 3D cache (X3D) die and the second die comprises a second X3D die.

17. The system of claim 9, wherein serializing the one or more phases across the plurality of dies comprises performing the one or more phases without throttling any of the one or more phases on any of the dies.

18. A computer-implemented method comprising:
performing a phase of an initialization activity on a plurality of dies within a multi-die integrated circuit, wherein an initiation time for the phase of the initialization activity on each die within the plurality of dies is staggered.

19. The computer-implemented method of claim 18, wherein the initialization activity comprises at least one of:
a repair fuse reading;
a memory built-in self test (MBIST); or
a memory initialization sequence.

20. The computer-implemented method of claim 18, wherein the plurality of dies comprises a base die and an extensible 3D cache (X3D) die.

* * * * *